(12) United States Patent  (10) Patent No.: US 9,193,371 B2
Sherman  (45) Date of Patent: Nov. 24, 2015

(54) CHILD'S ACTIVE TRANSPORTATION DEVICE AND METHOD OF USE

(71) Applicant: William Alan Sherman, Bronx, NY (US)

(72) Inventor: William Alan Sherman, Bronx, NY (US)

( * ) Notice: Subject to any disclaimer, the term of this patent is extended or adjusted under 35 U.S.C. 154(b) by 0 days.

(21) Appl. No.: 14/171,783

(22) Filed: Feb. 4, 2014

(65) Prior Publication Data

US 2014/0217705 A1  Aug. 7, 2014

Related U.S. Application Data

(60) Provisional application No. 61/760,630, filed on Feb. 4, 2013.

(51) Int. Cl.
| | |
|---|---|
| *B62B 3/00* | (2006.01) |
| *B62B 7/06* | (2006.01) |
| *B62B 5/08* | (2006.01) |
| *B62B 7/04* | (2006.01) |
| *B62B 9/20* | (2006.01) |
| *B62K 3/00* | (2006.01) |
| *B62K 9/00* | (2006.01) |

(52) U.S. Cl.
CPC . *B62B 7/06* (2013.01); *B62B 5/087* (2013.01); *B62B 7/04* (2013.01); *B62B 9/20* (2013.01); *B62K 3/002* (2013.01); *B62K 9/00* (2013.01); *B62B 7/042* (2013.01)

(58) Field of Classification Search
CPC ...... B62B 3/007; B62B 2205/00; B62B 5/04; B62B 5/067
USPC .............. 280/658, 647, 642, 650, 47.11
See application file for complete search history.

(56) References Cited

U.S. PATENT DOCUMENTS

| | | | | | |
|---|---|---|---|---|---|
| 1,710,849 | A | * | 4/1929 | Watson | 280/88 |
| 2,001,647 | A | * | 5/1935 | Alt | 180/409 |
| 2,913,250 | A | * | 11/1959 | La Fever | 280/87.01 |
| 3,500,965 | A | * | 3/1970 | Antin et al. | 188/29 |
| 4,087,104 | A | * | 5/1978 | Winchell et al. | 280/210 |
| 5,857,695 | A | * | 1/1999 | Crowell | 280/651 |
| 5,875,695 | A | * | 3/1999 | Zavilla | 81/488 |
| 6,508,479 | B1 | * | 1/2003 | Tseng | 280/47.34 |
| 6,585,065 | B1 | * | 7/2003 | Frejaville | 180/65.1 |
| 7,234,722 | B1 | | 6/2007 | Madigan | |
| 2006/0255564 | A1 | * | 11/2006 | Ayre | 280/642 |

* cited by examiner

*Primary Examiner* — Hau Phan
*Assistant Examiner* — Bryan Evans
(74) *Attorney, Agent, or Firm* — Richard Mark Blank, Esq.

(57) ABSTRACT

A child's active transportation device comprising: a steering rod permanently or removably affixed to a wheel base, said wheel base having a platform and mechanism or device for affixing a plurality of wheels to said wheel base, and also having a plurality of wheels and associated equipment and method of use.

30 Claims, 2 Drawing Sheets

CHILD'S ACTIVE TRANSPORTATION DEVICE AND METHOD OF USE

PRIORITY

This patent application claims the benefit under Title 35, United States Code, Section 119(e) of any U.S. Provisional Patent Application(s) listed below:

Application Ser. No. 61/760,630 having a filing date of Feb. 4, 2013

FIELD OF THE INVENTION

The present invention relates to an improved child mobility device and more particularly to an improved child's active transportation device.

BACKGROUND

For hundreds of years, parents have used baby carriages and strollers as a primary means of transporting young children. While many improvements have been made, they still today remain cumbersome and limited in their practicality when transporting children old enough to walk. Additionally, due to the method of pushing for propulsion, this method may also require physical effort and may create discomfort for the parent or guardian.

Young children who are old enough to walk are usually difficult to confine in small carriages or strollers as they get restless and bored. Additionally, they are removed from direct involvement with their parent or guardian pushing the carriage or stroller. Children old enough to walk are very energetic and typically want constant interaction. By confining them to carriages and strollers, parents and guardians push or pull the carriage or stroller at a distance, forcing the child to inactively ride without easy adult interaction.

When children grow out of carriages it becomes difficult for them to keep up with adults on long walks or trips to events that require a lot of walking Young walking children are usually not accustomed to walking long distances, but they also refuse be squeezed into strollers that they no longer enjoy. Wagons can be strenuous to drag around and tricycles with push bars can be equally uncomfortable for adults. These items also require the kids to be ahead or behind the adults and are bulky. This leaves parents or guardians to carry their children, which can be very strenuous for the adult and often cannot be done for long enough to efficiently transport the child.

When a child starts to walk, strollers typically become a preferable choice over carriages. By the time a child is about two years old they are eager to walk on their own; around the age of three years or so, parents and guardians generally have no viable options for mobilizing their children efficiently. The most accessible and common choices are tricycles and wagons that tend to be bulky/heavy, strapping them in strollers that can be equally cumbersome and annoying to most older children, or simply having them walk. This leaves a void and need for a lightweight, collapsible, small, and easy to carry transportation device that enables children to be propelled safely by their parent or guardian while riding in a more active manner.

Many parents or guardians use scooters as a means of mobilizing their children. However, these devices are self-propelled by the child leaving the parent or guardian with no control over their movement. Stooping to control scooters can be strenuous, and can be unsafe as they can be difficult to keep from gliding away. Scooters can be dangerous in many environments, particularly for younger children first learning to ride. With older children, scooters can become hazardous for bystanders as there is no control over speed and direction by parents or guardians and children often cannot fully and safely control scooters in situations where pedestrian or vehicular traffic creates hazards.

There is a need for a Child's Active Transportation Device that enables the children to remain alongside, as opposed to in front of or behind, the parent or guardian in a standing, squatting or sitting position. This way, they can easily interact while the child rides. The present invention can be a cost effective and viable solution that enables efficient active transportation while maintaining safe control by the parent or guardian. Current means of transporting children tend to keep the child sedentary and therefore inactive, or tend to lack adequate safety and braking features to prevent the device from moving without a parent or guardian making it do so. In the standing position of the present invention children are additionally elevated by the height of such a device and therefore able to hear and be heard by the parent or guardian, thereby improving interaction and the ability to remain actively involved while riding.

An active transportation device of this sort would greatly improve the interaction and activity of children while on any long walk with their parent or guardian. It would also offer parents or guardians an ergonomic solution for comfort and efficiency problems that typically exist with carriages, strollers, wagons, tricycles or children's cars with push bars, or other children's transportation devices currently available. This is a particularly important while transporting children through large event spaces like street fairs, parks, outdoor music events, amusement parks, museums, and theme parks. Many of these public and privately owned venues restrict use of scooters, tricycles, and other similar active devices due to the potential hazards of colliding with other individuals. Carriages and strollers typically restrict children's ability to participate in the event as they are strapped to the device in a sitting or lying down position. Therefore there is a great need for a transportation device that allows for a child to stand alongside making them feel like they are walking with their parent or guardian and not just being transported.

Carriages, strollers, wagons, tricycles or children's cars with push bars, or other children's transportation devices currently available are also typically bulky and hard to transport on subways, buses, taxi cabs, cars, airplanes, and other forms of mass transportation. The present invention can be smaller and easier to fold than these traditional devices, making it easy to carry on subways, buses, taxi cabs, cars, airplanes, and other forms of mass transportation.

Comparison to Strollers and Carriers

1. Child's Active Transportation Device can accommodate older children than strollers and carriages.
2. Child's Active Transportation Device can be steered by non-riding person from alongside. The use of this invention is not limited to pushing or pulling from in front or behind as with most traditional strollers and carriages.
3. Child can stand, squat, or sit on the Child's Active Transportation Device. On traditional strollers or carriages children can only sit or lay down.
4. When riding a Child's Active Transportation Device, the child can hold the steering bar for balance. In a carriage or stroller children are typically strapped in.
5. The Child's Active Transportation Device can be smaller and lighter than strollers and carriages and can fold small and light enough to carry for long periods of time and for easy storage. Strollers and carriages are usually more bulky and cumbersome to carry when folded.
6. The Child's Active Transportation Device can be smaller and lighter than strollers and carriages and can fold small and light enough to easily carry onto and off of public transportation methods including subways, buses, taxi cabs, cars, airplanes, and other forms of mass transportation. Strollers and carriages typically are bulkier and difficult to navigate off of and onto these transportation methods.
7. Strollers and carriages have a bed or full-backed seat where child sits or lays down in a restrained position. Child's Active Transportation Device has a platform for active riding.
8. Strollers and carriages are designed to transport children while sleeping or resting, but do not encourage active participation while transporting. Child's Active Transportation Device can require the child to remain active and enables participation while transporting.
9. Strollers and carriages use straps to harness children for safety. They often come with additional straps to prevent the device from rolling away from the non-riding person. Child's Active Transportation Device can use a braking system and/or tether to non-riding person. The braking system, which can be configured to default in the braked position can prevent the device from rolling without the non-riding person releasing the brake(s).

Comparison to Scooters

1. Scooters are self-propelled by rider. Child's Active Transportation Device can propelled by non-riding person.
2. Non-riding person has no control over the scooter's movement. Child's Active Transportation Device can be steered by non-riding person only.
3. Scooter can roll when not actively stopping the device. Child's Active Transportation Device cannot roll without actively releasing the safety brake(s) when present or while to tethered or steered by the non-riding person.
4. Scooters traditionally are unstable, tilting while turning or leaning Child's Active Transportation Device can remain stable without tilting at all times.
5. Scooter's steering rod can be adjustable to the height of the rider. On Child's Active Transportation Device, steering rod can be adjustable to the height of the non-riding person.
6. Child's Active Transportation Device can accommodate younger children unable to adequately control a scooter.
7. On a Child's Active Transportation Device, a child can stand, sit, or squat. A scooter is designed for the rider to stand on.
8. On a scooter, the rider typically stands with one foot behind the other. On a Child's Active Transportation Device the rider can stand where the feet and legs are able to be spread to the right and left out beyond the torso and upper body.
9. On a scooter, the rider typically learns to balance by holding the steering rod. On a Child's Active Transportation Device, the rider can balance holding the steering rod, which is stabilized by the non-riding person, a wider platform, braking system when present, and tether when present.

Comparison to Wagons and Other Ride-on Toys

1. Child's Active Transportation Device can accommodate older children than wagons and other ride-on toys.
2. Child's Active Transportation Device can be steered by non-riding person from alongside. The use of this invention is not limited to pushing or pulling from in front or behind as with most traditional wagons and other ride-on toys.
3. Child can stand, squat, or sit on the Child's Active Transportation Device. On traditional wagons and other ride-on toys children can only sit.
4. When riding a Child's Active Transportation Device, the child can hold the steering bar for balance. On traditional wagons and other ride-on toys children typically cannot balance while standing.
5. The Child's Active Transportation Device can be smaller and lighter than wagons and other ride-on toys and can fold small and light enough to carry for long periods of time and for easy storage. Wagons and other ride-on toys are usually more bulky and cumbersome to carry and typically cannot be easily folded.
6. The Child's Active Transportation Device can be smaller and lighter than wagons and other ride-on toys and can fold small and light enough to easily carry onto and off of public transportation methods including subways, buses, taxi cabs, cars, airplanes, and other forms of mass transportation. Wagons and other ride-on toys typically are bulkier and difficult to navigate off of and onto these transportation methods.
7. Wagons and other ride-on toys have a bed, body, or attached or removably attached full seats where child sits. Child's Active Transportation Device has a platform for active riding.
8. Wagons and some ride-on toys are designed to transport children who remain mostly inactive during transport. Some other ride-on toys are designed for active propulsion by rider and for recreational purposes only. These other ride-on toys are not designed for propulsion by non-riding person or for transportation. Child's Active Transportation Device is designed for active transportation propelled by a non-riding person.
9. Wagons and other ride-on toys typically do not use a braking device controlled by a non-riding person. Child's Active Transportation Device can use a braking system and/or tether to non-riding person. The braking system, which can be configured to default in the braked position, can prevent the device from rolling without the non-riding person releasing the brake(s).
10. When present on most ride-on toys, brake(s) default in the non-braking position and can be engaged by the rider. When present in the Child's Active Transportation Device, the brake(s) default in the braking position and can be released or dis-engaged by the non-riding person.

SUMMARY OF THE INVENTION

The Child's Active Transportation Device is a child mobility device that in a cost effective manner has addressed some of the major challenges in the field that have not been addressed by traditional strollers, carriages, scooters, wagons, and other ride-on toys.

This invention represents an improved child mobility device and more particularly to an improved child's active transportation device. A child's active transportation device comprising of a steering rod permanently or removably affixed to a wheel base, said wheel base having a platform and mechanism or device for affixing a plurality of wheels to said wheel base, and also having a plurality of wheels and associated equipment. This invention can also have an attaching and/or connecting device for attaching and/or connecting the steering rod to the wheel base or platform.

The attaching and/or connecting device of the invention can also be a steering device and/or braking device. The attaching and/or connecting device functions to allow four directions being forward, backwards, left, or right, controlling the direction of movement of the invention when performing as a steering device. This attaching and/or connecting device can also function like a joystick when performing as a steering device.

The Child's Active Transportation Device can comprise a braking system. The invention can have a handle or knob attached, or as part of the steering rod. It can also include a brake release. The steering rod can be configured or adjusted for a non-riding person. The steering rod can also have a steering rod height lock.

The Child's Active Transportation Device can be positioned so that a non-riding person is standing or walking to the right or left of this invention. The wheel base and/or platform can be configured wide enough for a rider's stance where the rider's feet and legs are able to be spread to the right and left out beyond the rider's torso and upper body. The wheel base and/or platform can be configured wide enough for any averaged sized child ranging from the ages of 2 to 10 to sit on the base. A seat back can be affixed or attachable/removable to the wheel base and/or platform. The rider can be situated in at least one of the following positions; standing, sitting, or squatting.

The steering rod can be structured in order that a non-riding person can steer said device by pushing forward to move forward, pushing backward to move backward, pushing to the right to turn right, or pushing left to turn left. The plurality of wheels can be three or more wheels. The Child's Active Transportation Device can also have a wheel turning mechanism, front wheel turning rod, front wheel mount(s), pivot bolt(s), rear wheel axel(s), and/or front wheel axel(s). The braking device can be configured to default with the brake(s) engaged. The braking device can be configured or adjusted for use and/or control by a non-riding person. The braking device can be disengaged by a non-riding person. The invention may also comprise a safety strap to tether the invention to the non-riding person.

The rider can balance by holding the steering rod or a handle permanently or removably affixed to the steering rod. The steering rod can collapse, fold, or telescope inward for easy storage or carrying. The Child's Active Transportation Device can also collapse or fold for easy storage or carrying. Additionally there can be a steering rod folding joint and lock.

The steering rod can be adjusted to suit the height of the non-riding person. The Child's Active Transportation Device can be made of at least one of the following; plastic, rubber wood, metal, nylon, fabric, ceramic, fiberglass, and/or polyurethane. The associated equipment to the wheels and wheel base can comprise at least one of the following; screws, nuts, bolts, axel, rim, hub caps or caps, covers, ball bearings, spokes, front wheel(s), rear wheel(s), front wheel turning rod, rear wheel turning rod, front wheel mount(s) and pivot bolt(s), rear wheel mount(s) and pivot bolt(s), rear wheel axel(s), front wheel axel(s), rubber, plastic, metal, fiberglass, or polyurethane. The wheel base can be flat enough, long enough, wide enough, and even enough that while stopped, without contact from the non-riding person, with the wheels on the ground, the brake(s) are automatically engaged keeping the device stationary and stable. The wheel base and/or platform can remain parallel or nearly parallel with the ground. Additionally, the wheel base and/or platform may not tilt when turning.

This invention can include an improved method of using a child mobility device and, more particularly, a child's active transportation device. First, the rider can step onto or can be placed onto the wheel base and/or platform. Second, the rider can at least one of; stand, sit, or squat on wheel base and/or platform. Third, the non-riding person standing to the right or left of the invention can place hand on, grab, or hold steering rod, steering knob and/or steering handle. Fourth, the non-riding person can at least one of hold, grab, touch, or put hand on the invention moving in any direction with the invention and rider gliding alongside. The rider can also hold the steering rod or permanently or removably affixed handle. The non-riding person can disengage the brake(s) by at least one of: applying pressure to, squeezing, pushing, and/or touching the steering knob and/or handle and/or brake release on the invention.

DETAILED DESCRIPTION OF DRAWINGS

Figure 1:
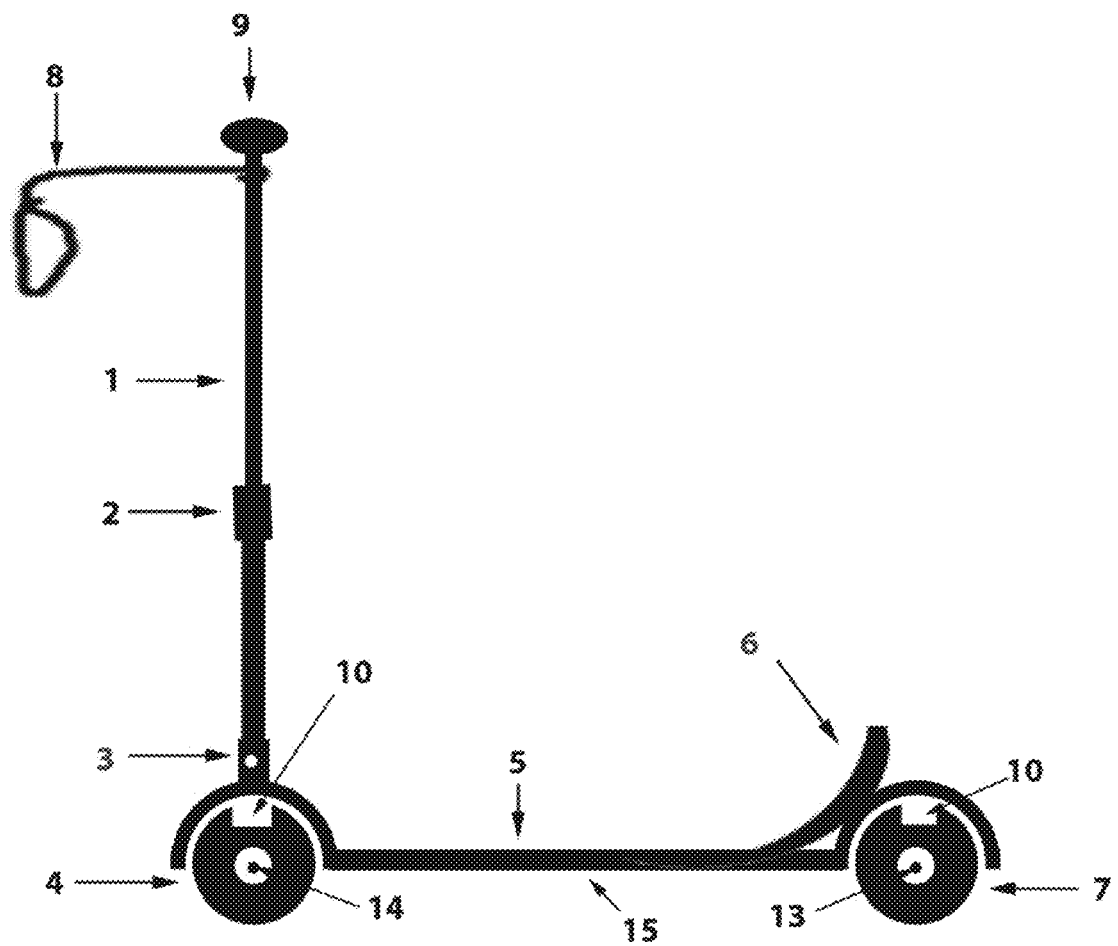
FIG. 1 is a side view of the invention.
Figure 2:
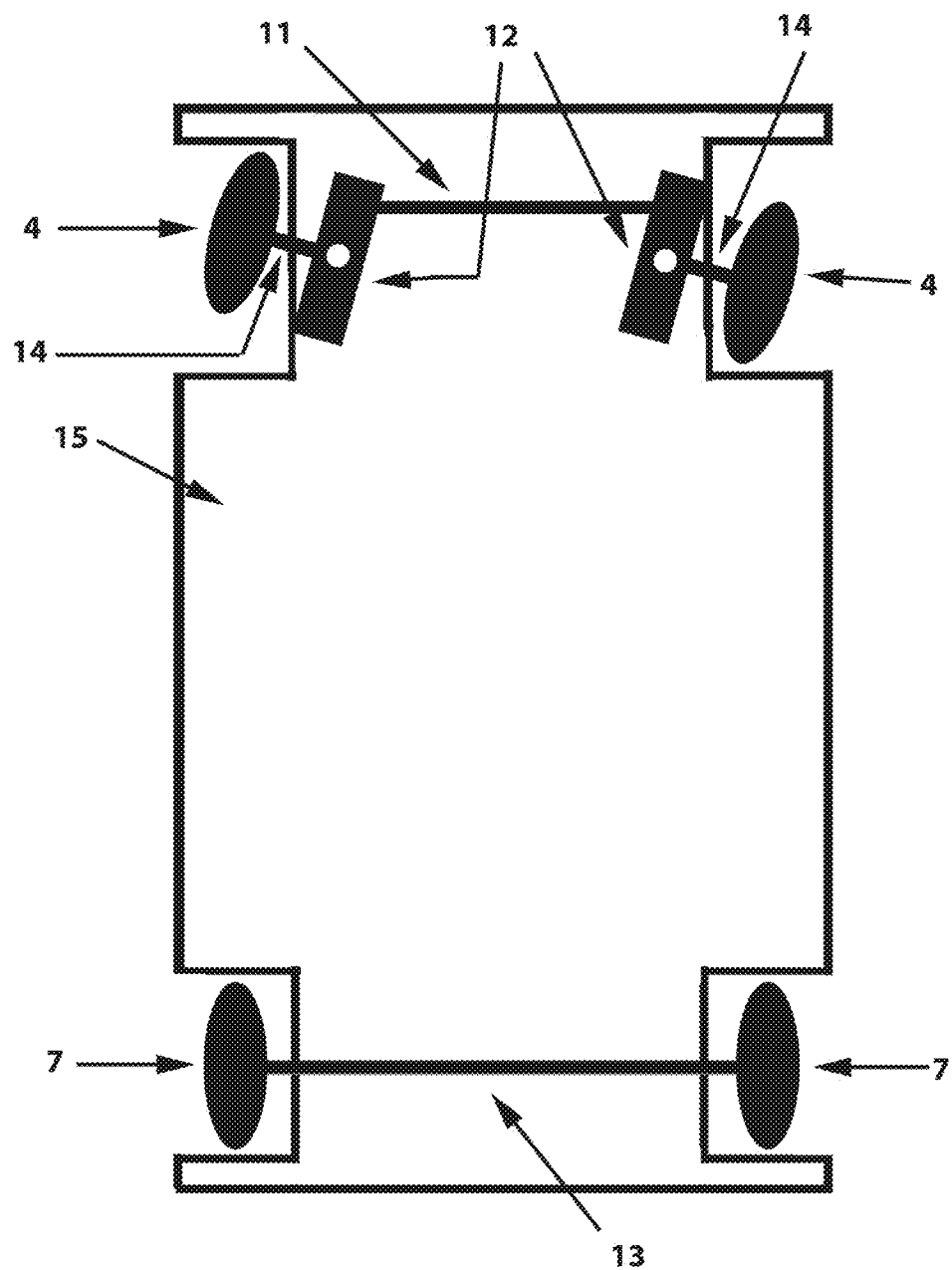
FIG. 2 is a bottom view of the invention.

FIG. 1 depicts one embodiment of the Child's Active Transportation Device whereby:

The Steering Rod 1 is depicted here in FIG. 1 as permanently affixed (it can also be removably affixed) to a Platform 5 and Wheel Base 15. The invention has a plurality of wheels. FIG. 1 and FIG. 2 depict the invention with four wheels. Two of the wheels are Front Wheels 4, which can be turning or non-turning wheels, and in this depiction are mounted on Front Wheel Axel(s) 14. The other two wheels are Rear Wheels 7, which can be turning or non-turning, and in this depiction are mounted on Rear Wheel Axel(s) 13.

Rider stands, sits, or squats on Platform 5 and Wheels Base 15, where the rider's feet and legs are able to be spread to the right and left (rider's feet and legs can be positioned in any direction) out beyond the rider's torso and upper body. Seat Back 6, which can be permanently attached or removably attached can be used in a variety of ways, including but not limited to, supporting rider in sitting position and prevent slipping off the back of device.

The invention as depicted in FIG. 1 also has a Steering Rod Height Lock 2, which can allow Steering Rod 1 to move up or down to adjust for height of non-riding person and can lock in place. Steering Rod Height Lock 2 can allow Steering Rod 1 to adjust to minimum height. Steering Rod 1 can be folded along Steering Rod Folding Joint And Lock 3. When folded down with Steering Rod 1 locked in minimum height position, Steering Rod Folding Joint And Lock 3 can lock Steering Rod 1 in horizontal position for easy carrying and/or storing.

Brake(s) 10 can be permanently affixed or removably affixed to a Wheel Base 15 and/or a Platform 5, which are both depicted here in FIG. 1. Brake(s) 10 can default in the engaged position, locking the Front Wheel(s) 4 and/or the Rear Wheel(s) 7 thereby partially or wholly immobilizing the invention. There can be a Brake Release 9, as depicted here in this embodiment and shown in FIG. 1, that is permanently or removably affixed to the top of Steering Rod 1 and connected to Brake(s) 10 to control or cause or initiate stopping. Non-riding person can push gently downward and/or squeeze and/or perform other action associated with Brake Release 9 to disengage Brake(s) 10 allowing device to roll with guidance of non-riding person. Having a first end and second end, the first end of Safety Strap 8 can be permanently or removably affixed to top of Steering Rod 1. The second end of Safety Strap 8 can be tethered to non-riding person to prevent device from rolling away or other use relevant to Safety Strap 8.

FIG. 2 depicts one embodiment of a Child's Active Transportation Device shown from a bottom view whereby:

Front Wheels 4, which can be turning or non-turning wheels, are affixed to Front Wheel Axel(s) 14. Front Wheel Axel(s) 14 are affixed to Front Wheel Mount(s) And Pivot Bolt(s) 12. Front Wheel Mount(s) And Pivot Bolt(s) 12 are affixed to Platform Base 5 allowing Front Wheel Mount(s) And Pivot Bolt(s) 12 to rotate clockwise or counter-clockwise along the axes of the bolt(s). Front Wheel Turning Rod 11 connects left and right Front Wheel Mount(s) And Pivot Bolt(s) 12. Front Wheel Turning Rod 11 can move right or left to rotate Front Wheel(s) 4 clockwise or counter clockwise in unison to affect proper turning of the invention. Rear Wheel(s) 7 are affixed to a free spinning Rear Wheel Axel(s) 13.

Non-riding person standing to the right or left of device can attach Safety Strap 8 to wrist of hand next to device. Non-riding person may hold, grab, or touch, or place their hand, palm, wrist, or related body part on Brake Release 9. With Brake(s) 10 engaged, rider steps onto Platform Base 5, stands with feet spread to the right and left out beyond or in alignment with the torso and upper body. Rider holds Steering Rod 1 below the Brake Release 9 to maintain balance. Non-riding person applies pressure, squeezes, pushes, and/or touches Brake Release 9 disengaging Brake(s) 10 and allowing for device movement.

Non-riding person steps forward with hand remaining on Brake Release 9 and disengaging Brake(s) 10 causing device to effortlessly roll forward. Non-riding person stops and/or removes pressure from Brake Release 9 causing Brake(s) 10 to engage and stop device and Rider from moving. Non-riding person removes hand entirely from Brake Release 9 causing Brake(s) 10 to engage and stop device and Rider from moving. Non-riding person steps backwards with hand on Brake Release 9 and disengaging Brake(s) 10 causing device and Rider to effortlessly roll backwards. Non-riding person stops and/or removes pressure from Brake Release 9 causing Brake(s) 10 to engage and stop device and Rider from moving.

When moving forward with hand remaining on Brake Release 9 and disengaging Brake(s) 10, Non-riding person applies lateral pressure on the Steering Rod 1 to the right or left to shift Front Wheel Turning Rod 11 right or left and affect turning of Front Wheel(s) 4.

PARTS LIST

1. Steering Rod
2. Steering Rod Height Lock
3. Steering Rod Folding Joint and Lock
4. Front Wheel(s)
5. Platform
6. Seat Back
7. Rear Wheel(s)
8. Safety Strap
9. Brake Release
10. Brake(s)
11. Front Wheel Turning Rod
12. Front Wheel Mount(s) and Pivot Bolt(s)
13. Rear Wheel Axel(s)
14. Front Wheel Axel(s)
15. Wheel Base

DEFINITIONS

Wheel Base—The main structure to which all other parts are affixed or connected thereto to other affixed parts all stemming from the wheel base Seat Back—A part permanently or removably affixed to the platform and/or the wheel base stemming therefrom in an upward or angled upward direction, curved or straight, for supporting or resting behind rider when in a sitting position.

Joystick—A controlling or input device consisting of a stick, lever, or rod that pivots on a base and reports its angle or direction to the device it is controlling. A joystick is the principal control device in the cockpit of many civilian and military aircraft. Joysticks are often used to control video games and for controlling machines such as cranes, trucks, underwater unmanned vehicles, wheelchairs, surveillance cameras, and lawn mowers.

DISCLAIMER EMBODIMENT LANGUAGE

It is to be understood that even though numerous characteristics and advantages of various embodiments of the present invention have been set forth in the foregoing description together with details of the structure and function of the various embodiments of the invention, this detailed description is illustrative only, and changes may be made in detail, and especially in matters of structure and arrangement of parts within the principles of the present invention to the full extent indicated by the broad general meaning of the terms in which the claims are expressed.

Although various embodiments of the present invention have been described it will be understood by those skilled in the art that the present invention should not be limited to the described embodiments. Rather, various changes and modifications can be made within the spirit and scope of the present invention.

What is claimed is:

1. Child's Active Transportation Device comprising: a single vertical steering rod permanently or removably affixed to a wheel base where said steering rod is configured or adjusted for a non-riding person standing to the right or left of the device;
   an attaching and/or connecting device for attaching and/or connecting the steering rod to the wheel base:
   said wheel base having a platform and mechanism or device for affixing a plurality of wheels to said wheel base, and also having said plurality of wheels and associated equipment;
   whereby said attaching and/or connecting device attaches to a wheel turning device activated by the lateral movement of the steering rod to turn the wheels right or left and also attaches to the wheel base limiting front to back pivoting so as to propel the device forward or backward with force applied to the steering rod;
   said steering rod and attaching and/or connecting device and wheel turning device functions as a steering device to allow four directions being forward, backwards, left, or right controlling the direction of movement;
   said steering rod functions like a joystick controlling four directions of movement being forwards backwards, left, or right and is controlled by a non-rider positioned to the left or right of the vehicle;
   The device additionally comprises brakes whereby said brakes default in the engaged position;
   said brakes are released by enacting a separate mechanism attached to the steering rod, pulling back on the steering rod propels the device backwards;
   said attaching and/or connecting device is also a braking device.

2. Child's Active Transportation Device of claim 1, additionally comprising: a braking system.

3. Child's Active Transportation Device of claim 1, additionally comprising: a handle or knob attached or as part of the steering rod.

4. Child's Active Transportation Device of claim 2, additionally comprising: a brake release.

5. Child's Active Transportation Device of claim 1, whereby the steering rod is configured or can be adjusted for a non-riding person.

6. Child's Active Transportation Device of claim 5, additionally comprising a Steering Rod Height Lock to configure, adjust, or secure the steering rod.

7. Child's Active Transportation Device of claim 5, whereby the device can be positioned so that a non-riding person is standing or walking to the right or left of Child's Active Transportation Device.

8. Child's Active Transportation Device of claim 1, whereby the wheel base and/or platform is configured wide enough for a rider's stance where the rider's feet and legs are able to be spread to the right and left out beyond the rider's torso and upper body, while the rider is holding onto the steering rod or handle permanently or removably affixed to the steering rod, for stability and balance.

9. Child's Active Transportation Device of claim 1, whereby the wheel base and/or platform is configured wide enough for any averaged sized child ranging from the ages of 2 to 10 to sit on the wheel base and/or platform, while the rider is holding onto the steering rod or handle permanently or removably affixed to the steering rod, for stability and balance.

10. Child's Active Transportation Device of claim 1, additionally comprising: a Seat Back affixed or attachable/removable to the wheel base.

11. Child's Active Transportation Device of claim 1, whereby a rider can be situated in at least one of the following positions; standing, sitting, or squatting.

12. Child's Active Transportation Device of claim 5, whereby the steering rod is structured in order that a non-riding person can steer said device by pushing forward to move forward, pushing backward to move backward, pushing to the right to turn right, or pushing left to turn left.

13. Child's Active Transportation Device of claim 1, whereby said plurality of wheels is three or more wheels.

14. Child's Active Transportation Device of claim 1, additionally comprises at least one of the following: a wheel turning mechanism, front wheel turning rod, front wheel mount(s), pivot bolt(s), rear wheel axel(s), and/or front wheel axel(s).

15. Child's Active Transportation Device of claim 1, whereby said braking device is configured to default with the brake(s) engaged.

16. Child's Active Transportation Device of claim 1, whereby the braking device is configured or can be adjusted for use and/or control by a non-riding person.

17. Child's Active Transportation Device of claim 15, whereby said braking device can be disengaged by a non-riding person.

18. Child's Active Transportation Device of claim 1, additionally comprising: a safety strap to tether the device to the non-riding person.

19. Child's Active Transportation Device of claim 1, whereby the steering rod is configured to collapse, fold, or telescope inward for storage and/or carrying.

20. Child's Active Transportation Device of claim 1, whereby the device is collapsible or foldable for carry or storage.

21. Child's Active Transportation Device of claim 20, additionally comprising a Steering Rod Folding Joint and Lock.

22. Child's Active Transportation Device of claim 5, whereby the steering rod can be adjusted to suit the height of the non-riding person.

23. Child's Active Transportation Device of claim 1, whereby the device in part or in whole are made of at least one of the following; plastic, rubber wood, metal, nylon, fabric, ceramic, fiberglass, and/or polyurethane.

24. Child's Active Transportation Device of claim 1, whereby the associated equipment comprises at least one of the following; screws, nuts, bolts, axel, rim, hub caps or caps, covers, ball bearings, spokes, front wheel(s), rear wheel(s), front wheel turning rod, rear wheel turning rod, front wheel mount(s) and pivot bolt(s), rear wheel mount(s) and pivot bolt(s), rear wheel axel(s), front wheel axel(s), rubber, plastic, metal, fiberglass, or polyurethane.

25. Child's Active Transportation Device of claim 1, whereby the wheel base is flat enough, long enough, wide enough, and even enough that while stopped, without contact from the non-riding person, with the wheels on the ground, the brake(s) are automatically engaged keeping the device stationary and stable.

26. Child's Active Transportation Device of claim 1, whereby the wheels base and/or platform remains parallel or nearly parallel with the ground.

27. Child's Active Transportation Device of claim 1, whereby the wheels base and/or platform does not tilt when turning.

28. A method of using a Child's Active Transportation Device controlled by non-rider comprising of the following steps:
  a. the device is placed in a stationary, non-moving position in front or to the side of rider allowing for the rider to step onto or be placed onto a wheel base and/or a platform section of the device;
  b. While the device is in said stationary, non-moving position, the device allow for the rider to at least one of; stand, sit, or squat on said wheel base and/or said platform section of the device;
  c. providing a steering rod, steering knob or steering handle section of the device, an attaching and/or connecting device for attaching and/or connecting the steering rod, steering knob or steering handle section to the wheel base and/or a platform attaches to a wheel turning device activated by the lateral movement of the steering rod to turn the wheels right or left and also attaches to the wheel base limiting front back pivoting so as to propel the invention forward or backward with force applied to the steering rod is located to the right or left hand side of the non-rider, enables non-rider to place hand on said steering rod, steering knob, or steering handle and exclusively control movement or non-movement of said device;
  d. a non-riding person at least one of holds, grabs, touches, or puts hand, palm, wrist, or related body part on the Child's Active Transportation Device, moves in the direction of, or stops with, movement of non-rider's right or left hand, palm, wrist, or related body part, while holding, grabbing, or touching said steering rod, steering knob, or steering handle such that said steering rod, steering knob or steering handle section functions like a joystick controlling four directions of movement being forwards, backwards, left, or right and is controlled by a non-rider and brakes which default in the engaged position are released by enacting a separate mechanism attached to the steering rod, steering knob or steering handle section of the invention;

e. the Child's Active Transportation Device continues to move in a direction via the momentum gained by the direction of movement of the non-rider while turning and stopping is fully controlled by the non-rider's right or left hand, palm, wrist, or related body part, holding, grabbing, or touching said steering rod, steering knob, or steering handle.

29. The method claim of 28, additionally comprising the following step(s): whereby the rider holds said steering rod and/or said steering handle and/or a brake release section of the device.

30. The method claim of 28, whereby non-riding person disengages brake(s) located on the device by at least one of: applying pressure, squeezing, pushing, and/or touching said steering knob and/or said steering handle and/or said brake release in the device.

\* \* \* \* \*